United States Patent [19]
Hosaka

[11] Patent Number: 5,243,165
[45] Date of Patent: Sep. 7, 1993

[54] WIRE-CUT ELECTROEROSION APPARATUS

[75] Inventor: Akio Hosaka, Fukui, Japan

[73] Assignee: Sodick Co., Ltd., Yokohama, Japan

[21] Appl. No.: 859,864

[22] Filed: Mar. 30, 1992

[30] Foreign Application Priority Data

Apr. 2, 1991 [JP] Japan .................. 3-096227

[51] Int. Cl.$^5$ ........................................... B23H 7/10
[52] U.S. Cl. ........................................... 219/69.12
[58] Field of Search ...................... 219/69.11, 69.12

[56] References Cited

U.S. PATENT DOCUMENTS

| | | | |
|---|---|---|---|
| 3,731,044 | 5/1973 | Ullmann et al. | 219/69.12 |
| 3,731,045 | 5/1973 | Ullmann et al. | 219/69.12 |
| 4,363,949 | 12/1982 | Pfau et al. | 219/69.12 |
| 4,808,787 | 2/1989 | Futamura | 219/69.12 |
| 4,973,812 | 11/1990 | Aramaki et al. | 219/69.12 |
| 5,070,224 | 12/1991 | Töpfer et al. | 219/69.12 |
| 5,086,203 | 2/1992 | Kobayashi et al. | 219/69.12 |

FOREIGN PATENT DOCUMENTS 261547 3/1988 European Pat. Off. .
3524377 1/1987 Fed. Rep. of Germany .

Primary Examiner—Geoffrey S. Evans
Attorney, Agent, or Firm—Marks & Murase

[57] ABSTRACT

An EDM machine comprises a machining tank which moves along X-axis. An upper guide and a lower guide are formed integrally with a Y-axis moving block. The Y-axis moving block moves along a pair of rails that are placed on a horizontal plane. The horizontal plane is formed on a column within which portions of the upper and lower arms are located. By having the moving block move on rails that are placed on a horizontal plane, rattling of the moving block is eliminated and the machining accuracy is improved. The workpiece is also more accessible due to the machining tank moving in only one direction and since portions of the lower and upper arms are located within the column.

10 Claims, 4 Drawing Sheets

WIRE-CUT ELECTROEROSION APPARATUS

BACKGROUND OF INVENTION

1. Field of the Invention

The invention generally relates to electroerosion machines and, more particularly, to wire-cut electric discharge machines which are capable of independent motion in the X and Y axes.

2. Description of Prior Art

In general, electrical discharges between a workpiece and an electrode remove pieces of the workpiece, thereby resulting in the cutting of the workpiece. In wire-cut electric discharge machines, a generally vertically extending wire is used as the electrode. As the wire moves relative to the workpiece, a contour is cut in the workpiece. The operation of machining using wire-cut electroerosion machine may be analogized with the cutting that occurs using a blade in a jigsaw or bandsaw as it cuts a contour in a workpieces.

A conventional EDM machine, such as the one depicted in FIG. 1, has a double deck construction comprising a saddle 4 and a table 6. The saddle 4 moves relative to the fixed bed 2 in the X-axis and the table 6 moves relative to the saddle 4 in the Y-axis. A machining tank 8 is located on the table 6 and holds a machining fluid. A workpiece 12 is mounted within the machining tank 8 by a mounting table 10.

A wire electrode feed mechanism 16 is located on a side of a fixed column 14. The feed mechanism 16 dispenses a wire electrode 18 through an upper guide 20, the workpiece 12, a lower guide 22, to a lower arm 24. The upper guide 20 not only moves in the vertical direction, which is the Z-axis, but also in a U-axis and in a V-axis for performing taper cuts. The lower arm 24 is fixed to the column 14 and to a slide plate. The slide plate enables the machining tank 8 to move in the X-axis relative to the lower arm 24 and provides a liquid tight seal between the lower arm 24 and the machining tank 8. Thus, by moving the saddle 4 in the X-axis and the table 6 in the Y-axis, machining of the workpiece may occur in an X-Y plane. Alternatively, the lower arm may instead be L-shaped and extend down from the fixed column 14 into the machining tank 8 without passing through a side of the tank 8.

The double deck arrangement of the saddle 4 and table 6 is suitable only for small light workpieces. As the workpieces become larger and heavier, the machining tank 8 must expand to accommodate the workpieces. Consequently, the saddle 4 and the table 6 must also be enlarged to maintain a full range of motion within the X-Y plane and so that they can support a heavier load.

The machining area is preferably positioned about 1 meter high to enable easy access by an operator. When larger or heavier workpieces are used, the double deck construction must increase in height in order to be able to withstand the heavier load. With a higher operating area, either a platform is needed to assist the operator to access the machining area or some portions of the machine would have to be embedded. In either event, access to the machining area is hindered.

Additionally, when the workpiece is moved to its furthest position on the Y-axis, forward and rear access to the workpiece is hindered. Thus, it is difficult to insert and remove workpieces from the machining tank 8.

Another example of a conventional EDM machine is illustrated in FIG. 2. The EDM machine depicted in FIG. 2 comprises a table 32 that moves a machining tank 34 along a Y-axis over a pair of rails that are affixed to a fixed bed 30. An upper guide 40 and a lower guide 42 are attached to a moving block 38 through an upper arm and lower arm, respectively. The moving block 38 moves along an X-axis on a pair of guide rails that are affixed to a vertical surface of a column 36. The motion in the X-axis is independent of the motion in the Y-axis.

With the EDM machine of FIG. 2, separate mechanisms are provided for moving the workpiece along the X-axis and the upper and lower guides along the Y-axis. This enables the EDM machine to handle larger and heavier loads without increasing the overall size of the machine.

The EDM machine of FIG. 2, however, still inhibits access to the workpiece when it is moved to its further position in the Y-axis. Also, both ends of the machining tank 34 are blocked by the column 36 to further hinder access to the workpiece. Additionally, an automatic pallet changer for automatically changing the workpieces would be difficult to use with the embodiment of FIG. 2. Further, since the moving block 38 was mounted on its side to the column 36, sub-micron accuracy in the machining is difficult to attain.

SUMMARY OF THE INVENTION

It is an object of the present invention to provide an EDM machine which allows for easy access to the workpiece.

It is another object of the present invention to provide an EDM machine which is highly accurate.

It is yet another object of the present invention to provide an EDM machine which provides separate and independent motion along the X-axis and along the Y-axis.

It is still a further object of the present invention to provide an EDM machine in which operability is not degraded, when designed to machine large workpieces.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, an electroerosion machine comprises a table for moving a workpiece along an X-axis and a Y-axis transfer mechanism for moving an upper guide and a lower guide along the Y-axis. The Y-axis transfer mechanism moves on a horizontal planar surface of the column. A wire feed mechanism feeds a wire electrode through the upper guide, workpiece, and then to the lower guide.

BRIEF DESCRIPTION OF THE DRAWINGS

The accompanying drawings, which are incorporated in, and form a part of the specification, illustrate an embodiment of the present invention and, together with the description, serve to explain the principles of the invention. In the drawings.

DETAILED DESCRIPTION OF THE PREFERRED EMBODIMENT

Figure 1:
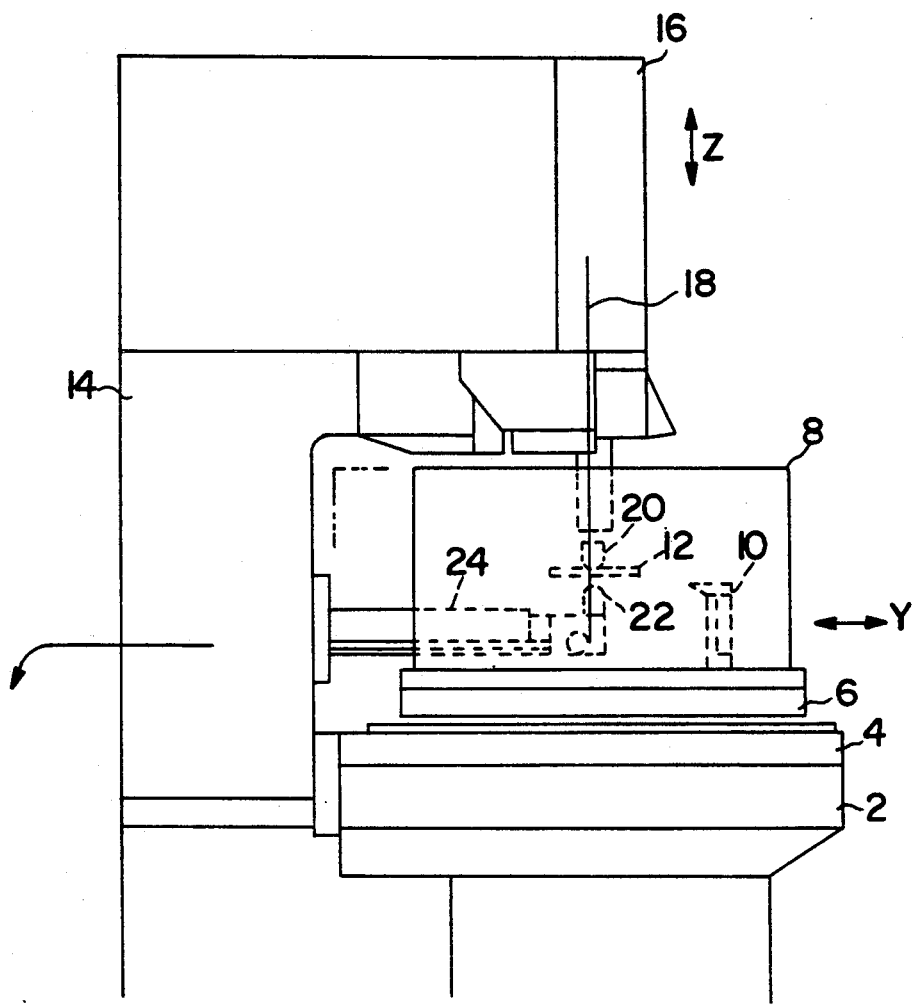
FIG. 1 illustrates a side view of a conventional wire-cut electric discharge machine.

Reference will now be made in detail to the preferred embodiment of the invention, an example of which is illustrated in the accompanying drawings.

An embodiment of the present invention is illustrated in FIGS. 3 to 6. An exemplary wire-cut EDM machine according to the present invention includes of a fixed bed 50 upon which a pair of rails 54 are affixed for guiding a table 56 along an X-axis. Preferably, for example, linear bearings and a servo motor may be provided for moving the table 56 along the X-axis. A machining tank 58, preferably having a rectangular shape and an open top end, is attached to the table 56 and has a mounting fixture 62 for holding a workpiece 60. A side wall of the machining tank 58 may be used as a door 64 for accessing the workpiece 60.

Figure 3:
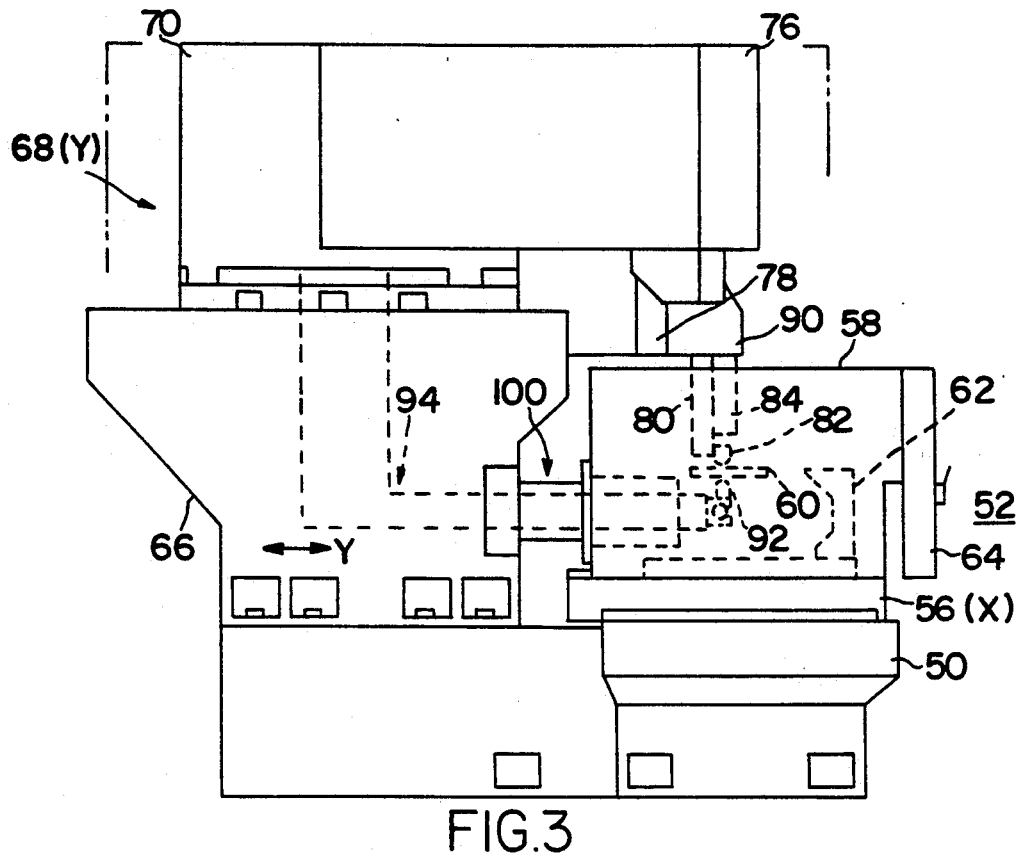
FIG. 3 illustrates a side view of an embodiment of the present invention.
Figure 5:
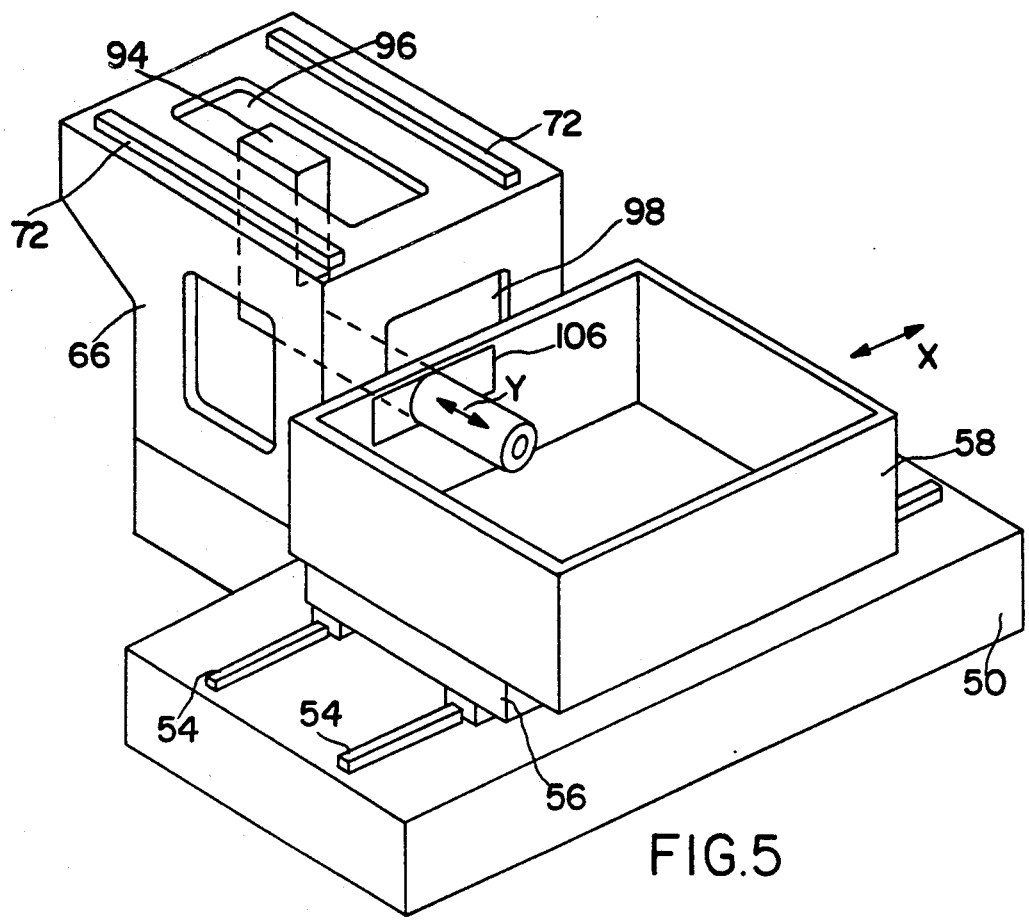
FIG. 5 illustrates a cut-away view of the embodiment of FIG. 3.

A fixed column 66 extends to a height above the machining tank 58 and preferably has a hollow construction as shown in FIG. 5. As best seen in FIG. 3, Y-axis movement mechanism 68 travels along a guide, for example, a pair of rails 72 on top of a horizontal plane of the column 66 as depicted in FIG. 5. The Y-axis movement mechanism also includes a moving block 70 which preferably comprises, for example, linear bearings and a servo motor for moving the mechanism 68 along the Y-axis.

Figure 4:
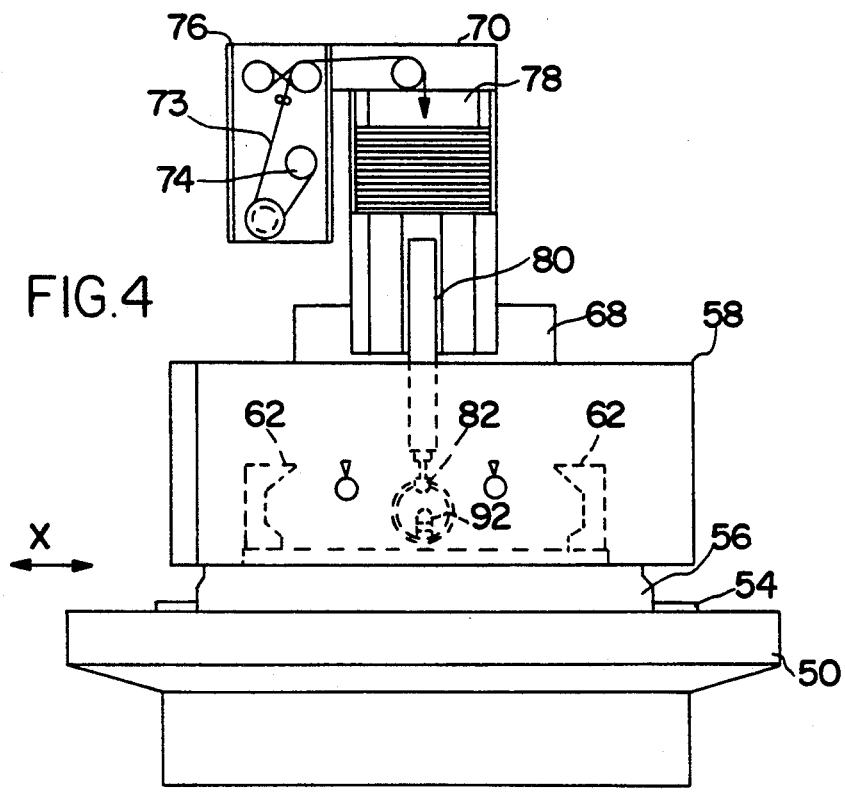
FIG. 4 illustrates a front view of the embodiment of FIG. 3.

With reference to FIG. 4, a wire bobbin 74, located at the forward end of the moving block 70, which also includes a plurality of rollers through which a wire electrode 73 is unwound. A wire feed device 76, also preferably positioned at the forward end of the moving block 70, dispenses the wire electrode to a block 78, which is movable in the Z-axis direction, and down through an upper arm 80. The block 78 moves the upper arm 80 and an upper wire guide 82 up and down along the Z-axis. A block 90 movable in the U-V plane is located between the upper arm 80 and the moving block 78 and moves the upper arm 80 and upper wire guide 82 in the U-V plane, which is parallel to the X-Y plane, in order to perform taper cuts. An automatic wire threading mechanism 84 (FIG. 3) may be provided for automatically threading the wire electrode 73.

A lower wire guide 92 receives the wire electrode 73 after it passes through the workpiece 60. From the lower wire guide 92, the wire electrode 73 passes through an L-shaped lower arm 94 (best seen in FIG. 5), which has its upper end integral with the moving block 70 (see FIG. 3). The lower arm 94 passes through an opening 96 in the column 66 before reaching the moving block 70. The lower arm 94 also passes through a second opening 98 in the column 66 and through an opening 106 in a side wall of the machining tank 58 (see FIG. 6). The lower arm 94 and the moving block 70 move along the Y-axis as a single assembly.

Figure 6:
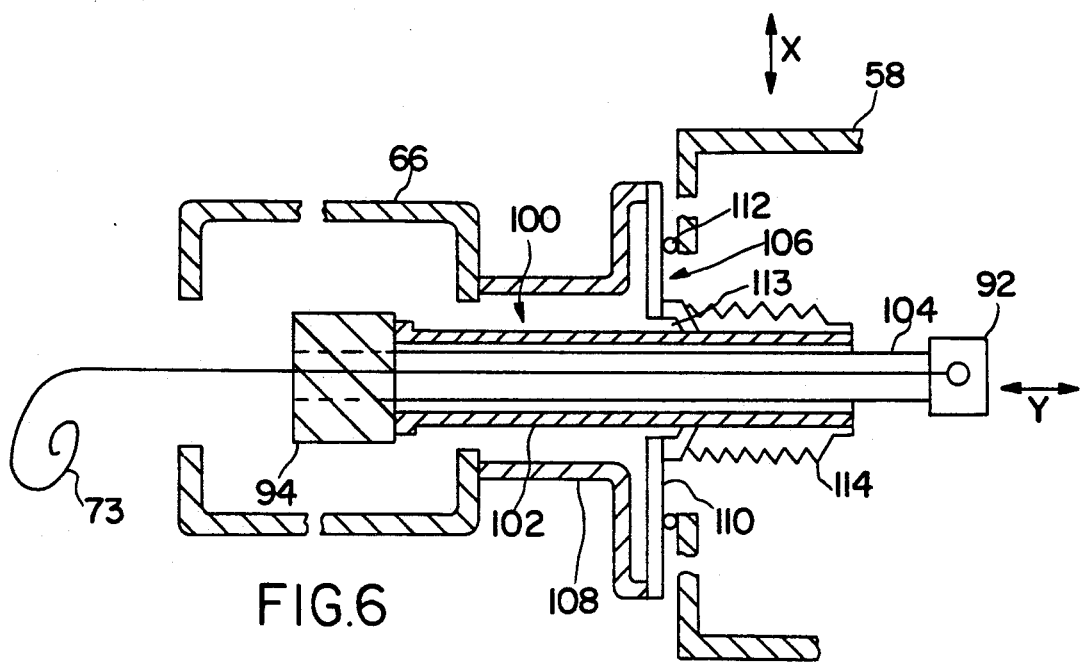
FIG. 6 illustrates a cross-sectional view of the embodiment of FIG. 3.

As best seen in FIG. 6, section 100 of the lower arm 94 extends from inside the column 66 to the inside of the machining tank 58. The section 100 preferably comprises a hollow outer cylinder 102 with an inner cylinder 104 inserted therein. The inner cylinder 104 extends slightly further inside the machining tank 58 than the outer cylinder 102. The lower wire guide 92 is positioned at the end of the inner cylinder 104 for receiving the wire electrode 73 from the upper wire guide 82. The wire then travels through the inner cylinder 104 to a take-up mechanism positioned downstream.

The opening 106 on the side wall of the machining tank 58 is wider than the maximum amount of motion along the X-axis so as to not cause any interference with the lower arm 94. As shown in FIG. 6, a slide plate 110, preferably formed of stainless steel, is attached to the fixed column 66 through a support 108. The slide plate 110 is also slidable relative to the machining tank 58 through a liquid-tight seal 112. The seal 112 and slide plate 110 enable the lower arm 94 to move along the X-axis in a sealed relationship with the machining tank 58.

Bellows 114, preferably made of compound rubber, extend from the tip of the outer cylinder 102 to the slide plate 110 to provide a liquid-tight seal therebetween. The bellows 114 seal an opening 113 between the outer cylinder 102 and the slide plate 110 and allow the lower arm unit to move along the Y-axis while preventing the machining fluid from draining out of the machining tank 58.

In operation, the wire electrode 73 is dispensed from the wire electrode feeder 76 through the automatic wire threader to the upper guide 82, through the workpiece 60, lower guide 92, down through the inner cylinder 104 of the lower arm 94, and then discharged outside of the machine.

To perform cuts along the X-axis, the table 56, supporting the machining tank 58 with the workpiece 60 mounted inside, is moved on a pair of rails 54 along the X-axis. The slide plate 110 and seal 112 enable movement along the X-axis in a sealed arrangement with the machining tank 58. To perform cuts along the Y-axis, the moving block 70 is movable along a pair of rails 72 which run parallel to the Y-axis. The upper arm 80, together with the upper wire guide 82, and the lower arm 94, together with the lower wire guide 92, move as a unit along the Y-axis together with the moving block 70. The contraction and expansion of the bellows 114 enable the lower arm 94 to move along the Y-axis in a sealed arrangement with the machining tank 58.

The distance between the upper wire guide 82 and the lower wire guide 92 is adjustable by means of the moving block 78, which moves the upper wire guide 82 up or down in the Z-axis. By moving the upper wire guide 82 in the U-V plane without moving the lower wire guide 92, the moving block 90 enables the EDM machine to perform taper cuts.

In practice, machining is accomplished by combinations of all types of motions. With the present invention, the machining tank 58 moves only along the X-axis and the wire electrode 73 is independently moved along the Y-axis. Together these movements define relative movement between the wire electrode and workpiece in the X-Y plane. The single deck construction of the invention, as opposed to the double deck construction of FIG. 1, reduces the need to expand the machine's size with larger and heavier workpieces. The single deck construction also reduces the height of the machine and therefore reduces the need for a platform or for any embedding of the machine. Even when the workpiece is moved to its furthest position along the Y-axis, the operator may still easily access the workpiece.

Figure 2:
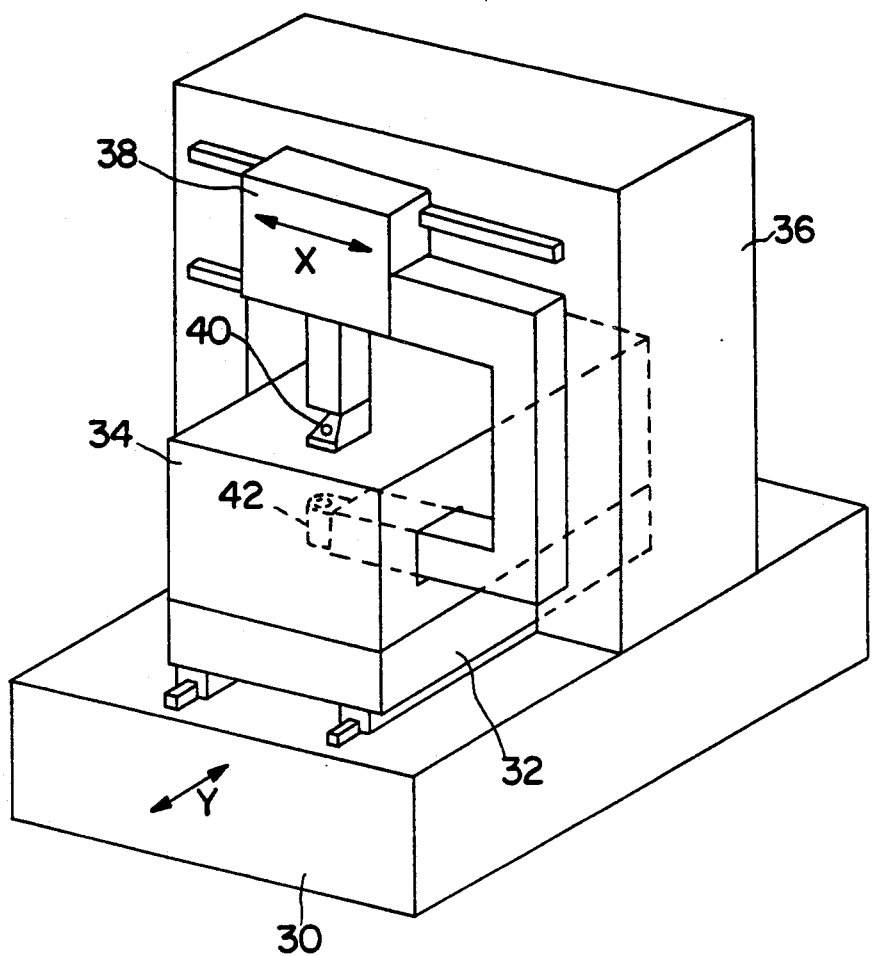
FIG. 2 illustrates a schematical view of another conventional electric discharge machine.

The invention uses a moving block 70 which moves along a pair of rails 72 and which are placed on a horizontal plane of the column 66. This is in contrast to the conventional design of FIG. 2 which places the rails onto a vertical surface of the column. By placing the rails on a horizontal surface, rattling of the moving block 70 is eliminated and the machining accuracy is improved. Also, since the column 66 is positioned generally behind the machining tank 58 and since the upper and lower guides, 82 and 92, respectively, are disposed within the column, both sides of the maching tank 58 are easily accessible and available, for example, for use with an automatic pallet changer.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the lower arm may be L-shaped and need not pass through a side wall of the machining tank 58. Also, instead of moving the machining tank 58 along the X-axis, a linear guide may be located between the upper and lower portions of the column for providing motion along the X-axis. The embodiment was chosen and described in order to best explain the principles of the invention and its practical application to thereby enable others skilled in the art to best utilize the invention in various embodiments and with various modifications as are suited to the particular use contemplated. It is intended that the scope of the invention only be limited by the claims appended hereto.

We claim:

1. An electric discharge machining having a wire electrode for cutting a contour in a workpiece to be machined and a worktable, positioned in a working zone of said machine, for supporting said workpiece, said worktable being supported on a fixed member and movable in the direction of a first axis, said fixed member having a first planar surface and said wire electrode being moveable in the direction of a second axis orthogonal to said first axis, said first axis and said second axis defining an X-Y plane in which said contour is cut in said workpiece by said wire electrode, said wire electrode extending in a direction which is generally orthogonal with respect to said X-Y plane and between an upper support and a lower support, said machine further comprising:

a column extending upwardly through said working zone from said fixed member and positioned rearwardly of said worktable for supporting said upper support and said lower support, wherein said column includes a second planar surface, said first and second planar surfaces being disposed parallel to said X-Y plane; said second planar surface having means for guiding said upper and lower supports in a direction parallel to said second axis whereby said upper and lower supports may be accurately positioned with respect to said plane.

2. The electric discharge machine according to claim 1, further comprising a pair of rails positioned on said second planar surface for guiding said upper support and said lower support as an integral unit along said second axis.

3. The electric discharge machine according to claim 1, wherein said lower support is partially disposed within said column.

4. The electric discharge machine according to claim 1, further comprising a pair of rails positioned on said first planar surface and extending in the direction of said first axis for guiding movement of said worktable.

5. The electric discharge machine according to claim 1, wherein one of said upper and lower support members are moveable in a plane, generally parallel to and spaced from said first-mentioned plane and along on a pair of axes which extend parallel to said first and second axis.

6. An electric discharge machine having a wire electrode for machining a desired contour in a workpiece supported in a working zone, said machine, in operation, causing relative movement between said workpiece and said wire electrode in an X-Y plane, and wherein said wire electrode extends generally orthogonally to said X-Y plane and through said working zone, said machine comprising:

a first planar surface positioned on a fixed member for supporting a first guiding means thereon, said first guiding means extending in one of said X and Y directions, said first planar surface extending parallel to said X-Y plane;

a column, fixed with respect to said fixed member, and extending upwardly past said working zone, rearwardly of said working zone;

a second planar surface positioned on said column for supporting a second guiding means thereon, wherein said first and second planar surfaces are spaced apart and supported with a fixed relationship therebetween, and wherein said second guiding means extends in the other of said X and Y directions from said first guiding means and said second planar surface extends parallel to said X-Y plane; and means supported on said first and second guiding means for causing relative movement between said wire electrode and said workpiece, whereby said desired contour may be cut in said workpiece in said X-Y plane.

7. The machine of claim 6, further comprising upper and lower wire guides positioned, respectively, above and below said working zone for guiding said wire electrode through said working zone, at least one of said wire guides being moveable in a U-V plane, spaced from and parallel to said X-Y plane, whereby said wire electrode is operable to be oriented to cut a tapered contour in said workpiece.

8. The machine according to claim 6, further comprising a worktable for supporting said workpiece in said working zone, and wherein said first guiding means comprises a pair of parallel rails extending in the direction of one of said X and Y axes for supporting movement of said worktable in said direction.

9. The machine according to claim 6, further comprising upper and lower wire guides for guiding said wire electrode through said working zone and means for supporting said upper and lower wire guides, wherein said second guiding means comprises a pair of parallel rails extending in the direction of one of said X and Y axes for supporting movement of the electrode in said direction.

10. The machine according to claim 6, wherein access to said working zone is unencumbered by structural support members from the front and sides.

* * * * *